(12) United States Patent
Chan et al.

(10) Patent No.: US 9,160,198 B2
(45) Date of Patent: Oct. 13, 2015

(54) BATTERY CHARGING METHOD AND DEVICE USING THE SAME

(71) Applicant: DELTA ELECTRONICS, INC., Taoyuan Hsien (TW)

(72) Inventors: Cheng-Chieh Chan, Taoyuan Hsien (TW); Yu-Lin Su, Taoyuan Hsien (TW); Chih-Hung Hsiao, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 189 days.

(21) Appl. No.: 13/948,679

(22) Filed: Jul. 23, 2013

(65) Prior Publication Data

US 2014/0111141 A1    Apr. 24, 2014

(30) Foreign Application Priority Data

Oct. 22, 2012    (CN) .......................... 2012 1 0403974

(51) Int. Cl.
*H02J 7/00*    (2006.01)
*H02J 7/34*    (2006.01)

(52) U.S. Cl.
CPC . *H02J 7/34* (2013.01); *Y02E 10/766* (2013.01)

(58) Field of Classification Search
CPC .......... H02J 7/34; H02J 7/007; Y02E 10/766
See application file for complete search history.

(56) References Cited

U.S. PATENT DOCUMENTS

| | | | | |
|---|---|---|---|---|
| 5,869,949 | A * | 2/1999 | Nishikawa et al. ........... | 320/101 |
| 8,182,826 | B2 | 5/2012 | Whitmire et al. | |
| 2008/0197811 | A1 * | 8/2008 | Hartular et al. ............... | 320/141 |
| 2011/0316548 | A1 * | 12/2011 | Ghantous et al. ............. | 324/427 |

* cited by examiner

*Primary Examiner* — Nha Nguyen
(74) *Attorney, Agent, or Firm* — Muncy, Geissler, Olds & Lowe, P.C.

(57) ABSTRACT

The battery charging method includes: defining first to third charging regions according to a first predetermined voltage and the charging saturation voltage of a battery; determining a charging region of the battery according to the initial voltage of the battery, and determining a threshold charging current according to the charging regions of the battery; charging the battery according to the threshold charging current; continuously measuring a plurality of voltages in the battery during a predetermined period and determining an average voltage of the battery; determining if the previously determined charging region of the battery has changed according to the average voltage of the battery; and when the charging region of the battery has changed and the average voltage of the battery is lower than the charging saturation voltage, then lowering the threshold charging current and repeating the above steps.

8 Claims, 3 Drawing Sheets

BATTERY CHARGING METHOD AND DEVICE USING THE SAME

CROSS REFERENCE TO RELATED APPLICATIONS

This Application claims priority of China Patent Application No. 201210403974.5, filed on Oct. 22, 2012, the entirety of which is incorporated by reference herein.

BACKGROUND OF THE INVENTION

1. Field of the Invention

The present invention relates to battery charging methods and devices, and in particular to methods and devices for charging batteries using an unstable power source.

2. Description of the Related Art

Following the recent trend of consumers being more environmentally conscious, the application of green energy or renewable energy such as wind power, solar energy, hydro power, and tidal power, has attracted great attention. The features of green energy sources are inherently unstable, however. Generally, green energy is transformed into electric power for storage, thereby enhancing the utilization efficiency of green energy.

Typical battery charging methods, such as Constant Voltage Charging (CV Charging), Constant Current Charging (CC Charging), Pulse Charging, and Reflex Charging, are based on having a stable power source as a charging source. The progress of the battery charging is determined through sampling voltage or current from the battery under charge. However, when these battery charging methods are performed using an unstable power source, the floating charge voltage of the battery will drift with the unstable power source, resulting in a variation of the sampling result from the battery and thus the risk of misjudging the battery charging progress. Taking wind power for instance, the charging current generated by the wind-driven generator is proportional to the wind power, and variations in the wind makes the charging current unstable, resulting in voltage drift in the battery under charge due to the battery's resistance. If the voltage or current of the battery is sampled directly during charging, misjudgment of the charging level of the battery may occur due to the instability of wind power. Thus, a method and device for charring batteries using unstable power sources are desired in order to enhance the utilization efficiency of green energy sources.

BRIEF SUMMARY OF THE INVENTION

In view of this, the present invention discloses a method for charging batteries using an unstable power source. The battery charging method comprises the steps of: (a) defining first to third charging regions according to a first predetermined voltage and the charging saturation voltage of a battery, wherein the charging saturation voltage is higher than the first predetermined voltage; (b) measuring the initial voltage of the battery; (c) determining the charging regions of the battery according to the initial voltage of the battery, from the first to the third charging regions, and determining a threshold charging current according to the charging regions of the battery; (d) charging the battery according to the threshold charging current; (e) continuously measuring a plurality of voltages in the battery during a predetermined period and determining an average voltage of the battery according to the plurality of voltages in the battery; (f) determining if the previously determined charging region of the battery has changed according to the average voltage of the battery; (g) when the charging region of the battery has changed and the average voltage of the battery is lower than the charging saturation voltage, then lowering the threshold charging current and repeating steps (d)~(f).

In step (f), if the previously determined charging region of the battery has not changed, then repeating steps (d)~(f). Otherwise, if the previously determined charging region of the battery has changed and the average voltage of the battery is equal to the charging saturation voltage, stopping the charging of the battery.

The present invention further discloses a device for charging batteries using an unstable power source, which comprises: an unstable power source, supplying an Alternating Current power source; a charging unit, receiving the Alternating Current power source and transforming the Alternating Current power source into a Direct Current power source to charge the battery, wherein the charging unit defines first to third charging regions according to a first predetermined voltage and the charging saturation voltage of the battery, and the charging saturation voltage is higher than the first predetermined voltage; and a voltage sampling unit, detecting the voltage of the battery and controlling the charging unit to charge the battery according to the detected voltage. The voltage sampling unit determines, from the first to the third charging region, the charging region of the battery according to the initial voltage of the battery to set a threshold charging current and control the charging unit to charge the battery using the threshold charging current. The voltage sampling unit continuously measures a plurality of voltages in the battery during a predetermined period, thereby determining the average voltage of the battery. According to the average voltage of the battery, if the voltage sampling unit determines the previously determined charging region has changed and the average voltage is less than the charging saturation voltage, then the voltage sampling unit controls the charging unit to lower the threshold charging current.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
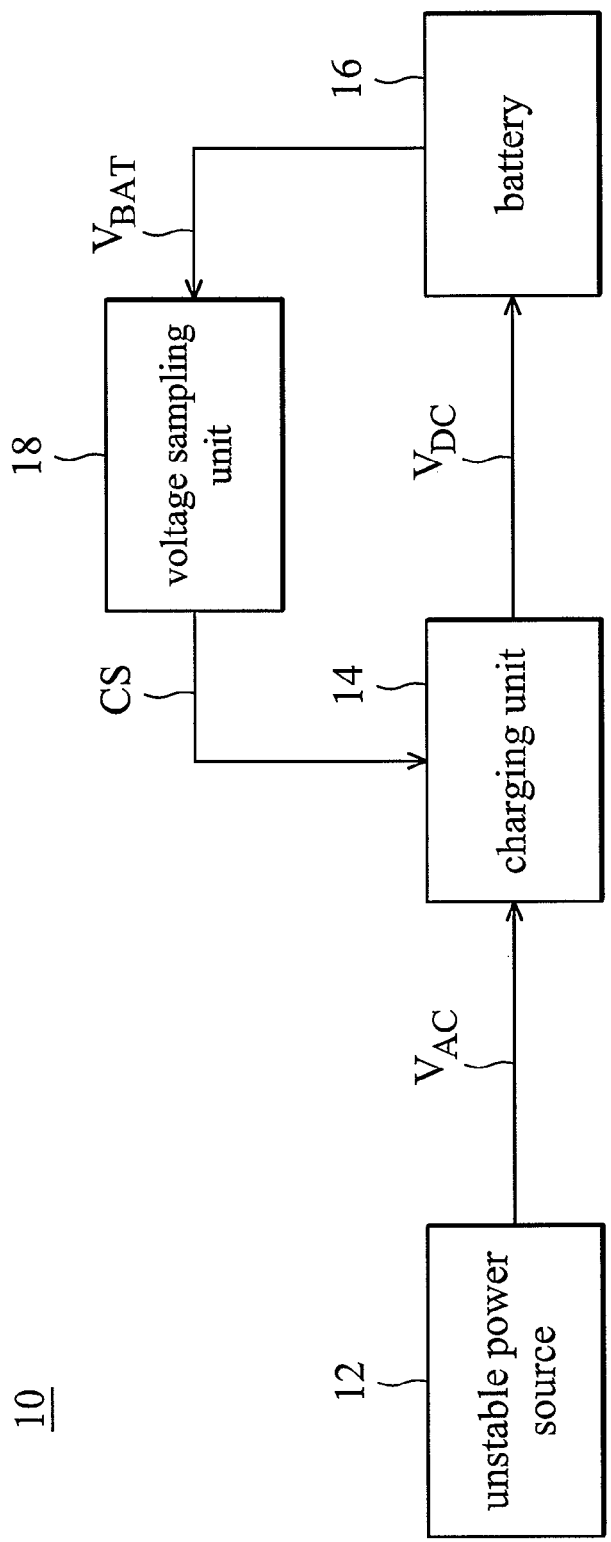
FIG. 1 is a schematic diagram of a charging device using an unstable power source according to an embodiment of the present invention.

FIG. 1 is a schematic diagram of a charging device 10 using an unstable power source according to an embodiment of the present invention. The charging device 10 comprises an unstable power source 12, a charging unit 14, a battery 16, and a voltage sampling unit 18. The unstable power source 12 can be the following power source at least: (1) Constant Voltage Source, outputting unstable current; (2) Constant Current Source, outputting unstable voltage; (3) Unstable Power Source, outputting unstable power, and the current drawn therefrom varying in response to variations of the output voltage thereof; and (4) AC (alternating current) power supply output from a power generator.

In this embodiment, for example, the unstable power source 12 may be any power generator that can provide an AC power supply, such as a wind-power generator, a hydraulic power generator, a geothermal power generator, or a solar power generator, but it's not limited thereto. The charging unit 14 receives an AC power supply ($V_{AC}$) and transforms the AC power supply ($V_{AC}$) into a DC power supply ($V_{DC}$) dynamically to charge the battery 16. Because the AC power supply ($V_{AC}$) supplied from the unstable power source 12 is unstable, the DC power supply ($V_{DC}$) transformed from the AC power supply $V_{AC}$ by the charging unit 14 is also unstable. The charging unit 14 sets up a plurality of charging modes in advance, wherein, for example, the charging modes comprise settings of threshold charging currents. According to a control signal CS, the charging unit 14 switches the different charging modes to charge the battery 16. In some embodiments, the charging unit 14 may charge the battery 16 according to the charging method such as Constant Current Charging (CC Charging), Pulse Charging, and Reflex Charging. The voltage sampling unit 18 detects the voltage $V_{BAT}$ of the battery 16 and generates the control signal CS according to the voltage $V_{BAT}$ of the battery 16 for dynamically adjusting the charging mode of the charging unit 14 charging the battery 16.

Figure 2:
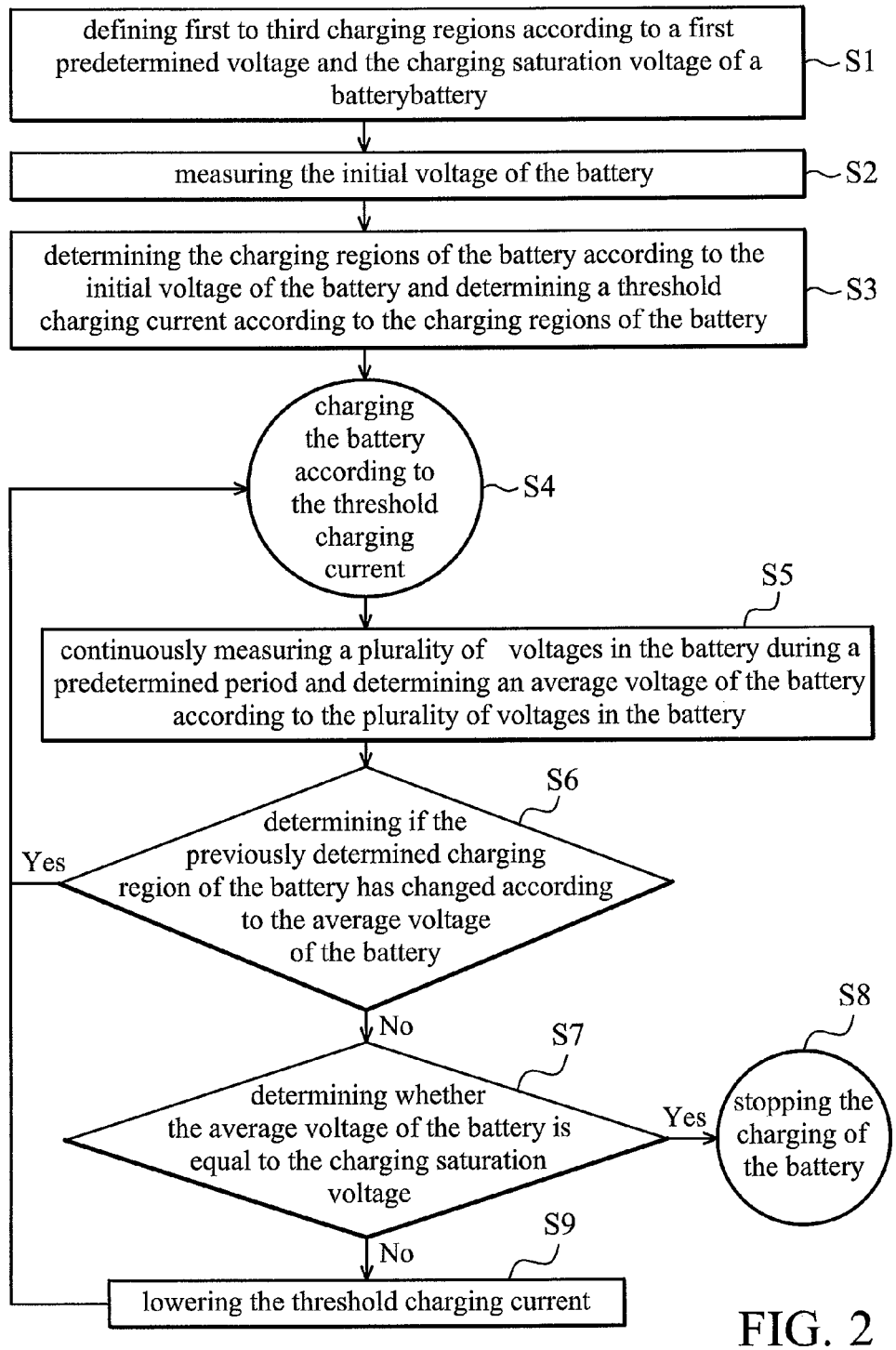
FIG. 2 is a flowchart of a charging method of the charging device 10 using an unstable power source for charging the battery 16 according to an embodiment of the present invention.

FIG. 2 is a flowchart of a charging method of the charging device 10 using an unstable power source for charging the battery 16 according to an embodiment of the present invention. In step S1, first the charging unit 14 defines at least three charging regions (or modes) according to at least a predetermined voltage and a predetermined charging saturation voltage of the battery 16. Every charging region or mode comprises at least a predetermined threshold charging current Imax.

In step S2, the voltage sampling unit 18 measures an initial voltage $V_{BAT}$ of the battery 16 before the charging operation. In step S3, the voltage sampling unit 18 determines a charging region of the battery 16 (or a charging mode of the charging unit 14) according to the charging region where the initial voltage $V_{BAT}$ of the battery 16 is, and determines a threshold charging current Imax for charging the battery 16 according to the charging region of the battery 16. In step S4, the charging unit 14 charges the battery 16 using the threshold charging current Imax.

In an embodiment, for example, the voltage sampling unit 18 of the charging device 10 measures the initial voltage $V_{BAT}$ of the battery 16 as 48V, determines the initial voltage $V_{BAT}$ of the battery 16 as in the charging region of "$V_{BAT}$<50" and further generates the control signal CS to set the charging unit 14 operating under a specific charging mode, wherein the threshold charging current Imax is correspondingly set to 25 A. Therefore, in step S4, the current supplied from the charging unit 14 for charging the battery 16 is no more than 25 A.

Referring to FIG. 2, in step S5, during the charging of the battery 16, the voltage sampling unit 18 continuously measures the voltage $V_{BAT}$ in the battery during a predetermined period and thereby determines an average voltage of the battery 16 according to the voltage $V_{BAT}$ in the battery. It is noticed that the voltage $V_{BAT}$ of the battery 16 will drift with the unstable power source 12 during the charging of the battery 16. Therefore, in step S5, the average voltage of the battery 16 is taken to reduce the misjudgment of the voltage $V_{BAT}$ of the battery 16, resulting from drifting. In step S6, the voltage sampling unit 18 determines if the previously determined charging region of the battery 16 has changed according to the average voltage of the battery 16. If the previously determined charging region of the battery 16 has not changed ("Yes" in step S6), then steps S4~S6 are repeated.

If the previously determined charging region of the battery 16 has changed ("No" in step S6), then step S7 is performed to determine whether the average voltage of the battery 16 is equal to the charging saturation voltage. If the average voltage of the battery 16 is equal to the charging saturation voltage ("Yes" in step S7), the battery 16 is fully charged. Then in step S8, the voltage sampling unit 18 transmits the control signal CS to make the charging unit 14 stop charging the battery 16; that is to say, the threshold charging current Imax is set to 0 A. If the average voltage of the battery 16 is not equal to the charging saturation voltage ("No" in step S7), the battery 16 is not fully charged, and then step S9 is performed. The voltage sampling unit 18 determines the charging mode of the charging unit 14 according to the charging region where the voltage $V_{BAT}$ of the battery 16 is and hereby controls the charging unit 14 to reset the threshold charging current Imax of the battery 16. Then, returning to step S4, the steps are repeated until the battery 16 is fully charged.

Figure 3:
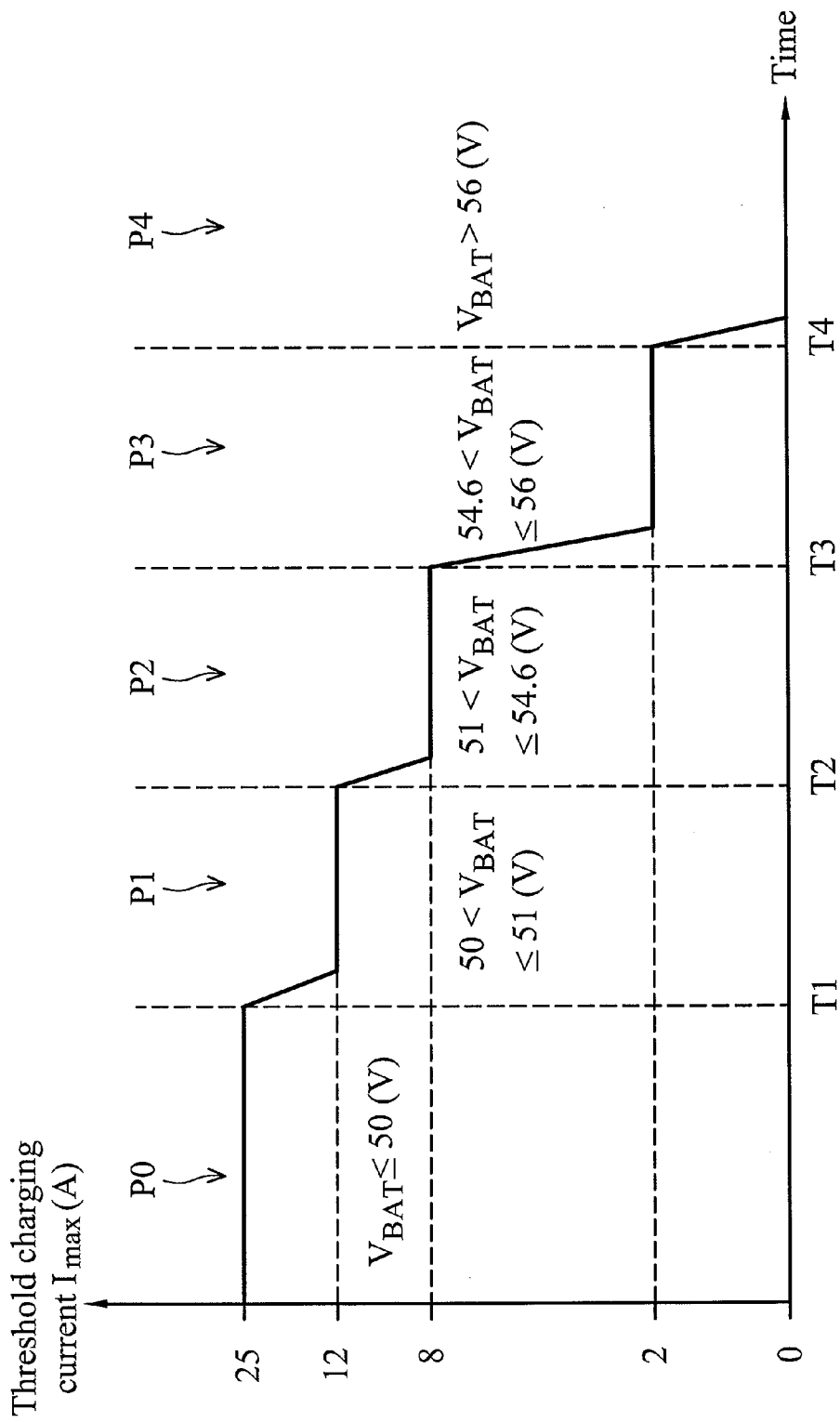
FIG. 3 is a threshold charging current versus time diagram, when the charging unit 14 is operated according to an embodiment of the present invention.

FIG. 3 is a threshold charging current versus time diagram, when the charging unit 14 is operated according to an embodiment of the present invention. The charging process of the charging device 10 using an unstable power source for charging the battery 16 is disclosed in FIG. 3.

As shown in FIG. 3, in step S1, the charging device 10 defines the plurality of charging regions (modes) P0 to P4 according to the first predetermined voltage V1=50V, the second predetermined voltage V2=51V, the third predetermined voltage V3=54.6V and the charging saturation voltage of the battery V4=56V. At least three charging regions are defined, and in this embodiment five charging regions are defined, but it's not limited thereto. When the voltage $V_{BAT}$ of the battery 16 is less than or equal to the first predetermined voltage V1 ($V_{BAT} \leq 50V$), the charging unit 14 is in charging mode P0 and the threshold charging current Imax is set to 25 A. When the voltage $V_{BAT}$ of the battery 16 is higher than the first predetermined voltage V1=50V and less than or equal to the second predetermined voltage V2=51V ($50V < V_{BAT} \leq 51V$), the charging unit 14 is in charging mode P1 and the threshold charging current Imax is set to 12 A. When the voltage $V_{BAT}$ of the battery 16 is higher than the second predetermined voltage V2=51V and less than or equal to the third predetermined voltage V3=54.6V ($51V < V_{BAT} \leq 54.6V$), the charging unit 14 is in charging mode P2 and the threshold charging current Imax is set to 8 A. When the voltage $V_{BAT}$ of the battery 16 is higher than the third predetermined voltage V3=54.6V and less than or equal to the charging saturation voltage V4=56V of the battery 16 ($54.6V < V_{BAT} \leq 56V$), the charging unit 14 is in charging mode P3 and the threshold charging current Imax is set to 2 A. When the voltage $V_{BAT}$ of the battery 16 is higher than the charging saturation voltage V4=56V of the battery 16 ($56V < V_{BAT}$), the charging unit 14 is in charging mode P4 and the threshold charging current Imax is set to 0 A.

In step S2, it is assumed that the initial voltage $V_{BAT}$ of the battery 16 measured by the voltage sampling unit 18 is 48V. The voltage sampling unit 18 determines that the initial voltage $V_{BAT}$ of the battery 16 is in the charging region $V_{BAT}$<50V and in step S3 further generates the control signal CS to set the charging unit 14 in charging mode P0, wherein the threshold charging current Imax is set to 25 A. In step S4, the charging unit 14 charges the battery 16 according to the threshold charging current Imax, wherein the charging current is not more than 25 A.

When charging the battery 16, step S5 is performed at the same time. The voltage sampling unit 18 continuously measures the floating voltage $V_{BAT}$ of the battery 16 repeatedly during the predetermined period and thereby determines an average voltage of the battery 16. In an embodiment, the predetermined period is set to 64 seconds, wherein the voltage sampling unit 18 records the floating voltage $V_{BAT}$ of the battery 16 once per second, determines an average floating voltage once every 8 seconds, and averages the 8 average floating voltages to obtain the average voltage of the battery 16.

In step S6, the voltage sampling unit 18 determines if the previously determined charging region of the battery 16 has changed according to the average voltage of the battery 16. Provided that the average voltage of the battery 16 determined by the voltage sampling unit 18 is 55V at time T3, the charging region of the battery 16 changes from the original charging region $V_{BAT} \leq 50V$ to the charging region $54.6V < V_{BAT} \leq 56V$. In step S7, further provided that the average voltage of the battery 16 is judged as not having reached the charging saturation voltage V4=56V.

Thus, in step S9, the voltage sampling unit 18 determines that the charging mode of the charging unit 14 is P3 according to the voltage $V_{BAT}$ of the battery 16 and thereby controls the charging unit 14 to reset the threshold charging current Imax to 2 A. Then, the charging process returns to step S4, and the above steps are repeated until the voltage $V_{BAT}$ of the battery 16 is larger than 56V at time T4 in step S7. The voltage sampling unit 18 determines the voltage $V_{BAT}$ of the battery 16 is in the charging region of $V_{BAT} > 56V$, then the charging of the battery 16 is finished. That is to say, the charging mode of the charging unit 14 is P4 and the threshold charging current Imax for charging the battery 16 is 0 A.

The present invention discloses a charging device using an unstable power source, which is adapted especially for the field of green energy. The charging device using an unstable power source samples the voltage of the battery by determining the average voltage of the battery to adjust the threshold charging current. Therefore, misjudgment of the charging level of the battery, resulting from an unstable power source, is reduced drastically. The utilization efficiency of green energy is enhanced drastically.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for charging batteries using an unstable power source, comprising:
   (a) defining first to third charging regions according to a first predetermined voltage, a second predetermined voltage, a third predetermined voltage, and a charging saturation voltage of a battery; wherein the charging saturation voltage is higher than the first predetermined voltage; wherein the second predetermined voltage is between the first predetermined voltage and the charging saturation voltage; wherein the third predetermined voltage is between the second predetermined voltage and the charging saturation voltage;
   (b) measuring the initial voltage of the battery;
   (c) determining a charging region of the battery according to the initial voltage of the battery and determining a threshold charging current according to the charging regions of the battery;
   (d) charging the battery according to the threshold charging current;
   (e) continuously measuring a plurality of voltages in the battery during a predetermined period and determines an average voltage of the battery according to the plurality of voltages in the battery;
   (f) determining if the previously determined charging region of the battery has changed according to the average voltage of the battery;
   (g) when the charging region of the battery has changed and the average voltage of the battery is lower than the charging saturation voltage, then lowering the threshold charging current and repeating steps (d)~(f), wherein if the previously determined charging region of the battery has changed and the average voltage of the battery is equal to the charging saturation voltage, stopping the charging of the battery, wherein the first charging region, the second charging region, and the third charging region correspond to a first threshold charging current, a second threshold charging current, and a third threshold charging current respectively, wherein the first threshold charging current is higher than the second threshold charging current, and the second threshold charging current is higher than the third threshold charging current.

2. The method for charging batteries using an unstable power source as claimed in claim 1, wherein if step (f) determining the previously determined charging region of the battery has not changed, then repeating steps (d)~(f).

3. The method for charging batteries using an unstable power source as claimed in claim 1, wherein the unstable power source comprises one of the following:
   a wind-power generator, a hydraulic power generator, a geothermal power generator, or a solar power generator.

4. The method for charging batteries using an unstable power source as claimed in claim 1, wherein step (f) further comprises: recording the relationship between the floating voltage of the battery and time during a 64-second period, determining an average floating voltage once every 8 seconds, and averaging the 8 average floating voltages to obtain the average voltage of the battery.

5. The method for charging batteries using an unstable power source as claimed in claim 1, wherein step (d) further comprises:
   charging the battery by means of Constant Current Charging (CC Charging), Pulse Charging, and Reflex Charging.

6. A charging device using an unstable power source for charging a battery comprises:
   an unstable power source, supplying an Alternating Current power source;
   a charging unit, receiving the Alternating Current power source and transforming the Alternating Current power source into a Direct Current power source to charge the battery, wherein the charging unit defines first to third charging regions according to a first predetermined voltage, a second predetermined voltage, a third predetermined voltage, and a charging saturation voltage of the battery, the charging saturation voltage is higher than the first predetermined voltage, the second predetermined voltage is between the first predetermined voltage and the charging saturation voltage, and the third predetermined voltage is between the second predetermined voltage and the charging saturation voltage; and a voltage sampling unit, detecting the voltage of the battery and controlling the charging unit to charge the battery according to the detected voltage;

wherein the voltage sampling unit determines, from the first to the third charging region, the charging region of the battery according to the initial voltage of the battery to set a threshold charging current and control the charging unit to charge the battery using the threshold charging current;

wherein the voltage sampling unit continuously measures a plurality of voltages in the battery during a predetermined period, thereby determining the average voltage of the battery;

wherein, according to the average voltage of the battery, if the voltage sampling unit determines the previously determined charging region has changed and the average voltage of the battery is less than the charging saturation voltage, then the voltage sampling unit controls the charging unit to lower the threshold charging current;

wherein if the voltage sampling unit determines the previously determined charging region of the battery has changed and the average voltage of the battery is equal to the charging saturation voltage, then the voltage sampling unit controls the charging unit to stop charging the battery;

wherein the first charging region, the second charging region, and the third charging region correspond to a first threshold charging current, a second threshold charging current, and a third threshold charging current respectively, wherein the first threshold charging current is higher than the second threshold charging current and the second threshold charging current is higher than the third threshold charging current.

7. The charging device using an unstable power source for charging a battery as claimed in claim 6, wherein the unstable power source comprises one of the following:

a wind-power generator, a hydraulic power generator, a geothermal power generator, or a solar power generator.

8. The charging device using an unstable power source for charging a battery as claimed in claim 6, wherein the voltage sampling unit records the relationship between the floating voltage of the battery and time during a 64-second period, determines an average floating voltage once every 8 seconds, and averages the 8 average floating voltages to obtain the average voltage of the battery.

\* \* \* \* \*